(12) United States Patent
Berry et al.

(10) Patent No.: US 7,536,680 B2
(45) Date of Patent: May 19, 2009

(54) METHOD FOR MODIFYING A CLASS FILE TO MONITOR DATA FLOW

(75) Inventors: Robert Francis Berry, Southampton (GB); Alan Petter Stevens, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/334,888

(22) Filed: Dec. 31, 2002

(65) Prior Publication Data

US 2004/0031020 A1 Feb. 12, 2004

(30) Foreign Application Priority Data

Aug. 10, 2002 (GB) ................... 0218680.7

(51) Int. Cl.
*G06F 9/44* (2006.01)
(52) U.S. Cl. ............... 717/130; 717/131; 717/158; 717/125; 717/126; 717/127
(58) Field of Classification Search .......... 717/2–139, 717/166; 709/202
See application file for complete search history.

(56) References Cited

U.S. PATENT DOCUMENTS

| | | | | |
|---|---|---|---|---|
| 5,784,553 A | | 7/1998 | Kolawa .................. 395/183.14 |
| 5,909,577 A | | 6/1999 | Devanbu .................. 395/704 |
| 6,026,237 A | * | 2/2000 | Berry et al. .................. 717/130 |
| 6,072,953 A | * | 6/2000 | Cohen et al. ................. 717/166 |
| 6,170,083 B1 | | 1/2001 | Adl-Tabatabai ............... 717/9 |
| 6,260,187 B1 | | 7/2001 | Cirne ........................ 717/1 |
| 6,314,558 B1 | | 11/2001 | Angel ........................ 717/4 |
| 6,662,359 B1 | * | 12/2003 | Berry et al. .................. 717/130 |
| 6,742,178 B1 | * | 5/2004 | Berry et al. .................. 717/130 |
| 6,760,903 B1 | * | 7/2004 | Morshed et al. .............. 717/130 |
| 6,816,880 B1 | * | 11/2004 | Strandberg et al. ........... 709/202 |
| 6,951,014 B1 | * | 9/2005 | Sokolov ..................... 717/139 |
| 2002/0023257 A1 | * | 2/2002 | Charisius et al. .............. 717/2 |
| 2002/0049963 A1 | * | 4/2002 | Beck et al. .................. 717/130 |
| 2004/0133882 A1 | * | 7/2004 | Angel et al. ................. 717/130 |

OTHER PUBLICATIONS

Lance, Don et al. "Bytecode-based Java Program Analysis." ACM. 1999.*
BIT: A Tool for Instrumenting Java Bytecodes (1997) pp. 1-3 (http://citeseer.nj.nec.com/lee97bit.html).

* cited by examiner

*Primary Examiner*—Lewis A. Bullock, Jr.
*Assistant Examiner*—Mark P. Francis
(74) *Attorney, Agent, or Firm*—Martin J. McKinley; Law Office of Jim Boice

(57) ABSTRACT

A method for modifying a class file to monitor data flow is provided. The method includes selecting (401) one or more methods in the class file and adding (206, 209) one or more lines of code to report incoming arguments and return values, if any, in the selected method. The incoming arguments and return values are reported (405, 410) to an instrumentation interface which may be an instrumentation class defining methods for each type of argument in the method. The one or more lines of code pass the incoming arguments and return values to the appropriate instrumentation class method. The method may produce a profile of data flow including a record of incoming arguments and return values, if any, for one or more methods in a class file. The record can include data describing the types and values of arguments and return values and their distribution.

1 Claim, 6 Drawing Sheets

METHOD FOR MODIFYING A CLASS FILE TO MONITOR DATA FLOW

FIELD OF THE INVENTION

This invention relates to the field of information processing systems and, more particularly, to software tools and methods for monitoring application data flow.

BACKGROUND OF THE INVENTION

The described implementation of the invention is described in the context of the Java language. However, the invention could be implemented in other languages such as the Microsoft Intermediate Language (MSIL).

The number of application programs written in the Java language is growing rapidly in number. One of the key reasons for this is the portability of Java code. A brief overview of Java is given below. Java is a trade mark of Sun Microsystems, Inc.

The Java language is an object-oriented programming language which is compiled to run on a Java Virtual Machine ("Java VM"). A Java VM is a computer which runs on top of the existing hardware and operating system of another computer system. Because the specifications for the Java VM have been published it is possible to write a Java VM to work with any hardware and/or operating system. Java programs are compiled into byte code, which will run on any Java VM. The Java VM essentially acts as an interpreter between the Java byte codes and the system on which the Java program is executing.

There are four main components to a Java VM, all of which are implemented in software. The four components are the registers, the operand stack, the garbage collected heap, and the method area. The method area contains the method code (i.e. the compiled Java code) and symbol tables. The compiled Java code i.e. the byte code, consists of a one byte opcode followed by any needed operands.

Compiled Java programs are typically referred to as Java class files. Many Java class files are downloaded from the Internet for execution on a user's computer system. One of the first steps performed by a Java VM is called verification. A class file verifier (part of the Java VM) ensures that the file truly is a Java class file and will execute without violating any Java security restrictions.

The class file verifier first checks to determine if the class file being loaded is of the correct class file format. The class file verifier checks to ensure that the class file being loaded is compatible with the VM loading it. The verifier also checks the information in the constant pool and other sections of the class file for consistency.

During the linking phase, the verifier ensures that all classes except for the Object class have a superclass that that all field and method references in the constant pool have valid names, classes, and type descriptors. In addition, the verifier checks the code array of the code attribute for each method to ensure that all local variables contain values of the appropriate type, that methods are classed with the appropriate arguments, and that fields are assigned correct values. The verifier also checks the operand stack for correctness.

Finally during execution, the verifier checks to ensure that a referenced type is allowed for instructions referencing a type. If an instruction modifies a field or calls a method, the verifier checks to ensure that the field or method is available and that the calling method is allowed to access the field or call the method.

Often, developers would like to measure the performance of a particular Java application in order to identify the sources of delay in the application. Some tools (like the precompiler Aspect J) could be used, however, such tools require access to the source code. Typically, however, the developer only has access to the Java class file and not to the source code. This makes it difficult to insert instrumentation code for measuring and analysing performance.

The Java runtime environment currently provides limited support for performance measurement and analysis. In addition, the class file verifier will not typically allow a class file to execute if it does not comply with all the requirements noted above. This means that instrumentation code cannot simply be added into the class file, as this would most likely cause the class file verifier to reject the class file. Similar problems occur whenever a developer desires to add, delete, or modify any code in an existing class file. For example, a developer may desire to add code for the purpose of performing benchmark tests or debugging. A developer may also desire to add, delete, or modify code for the purpose of making functional modifications to the class file.

U.S. Pat. No. 6,026,237 discloses a system and method for modifying a class file for the purpose of instrumentation, debugging, benchmarking, or making functional modifications to the class file. The method deconstructs a class file into its components and then modifies selected components by adding, deleting, or changing code within the components. The class file is then reconstructed, following all class file constraints imposed by the class file verifier.

In object-oriented programming, objects are variables comprising both routines and data that is treated as a discrete entry. A class is a category that defines a data structure and a set of methods that operate on that data. In a Java program, referred to as a class file, methods are processes performed by an object when it receives a message. When a method is called, values referred to as arguments are passed that are assigned to the corresponding parameters defined by the method and the method returns a value.

Java VM performance has been improved by a VM technology called just-in-time (JIT) compilation. In JIT, Java byte codes are converted on-the-fly into native-platform machine language. This increases the execution speed for code that is run repeatedly.

Performance analysts use many different kinds of tools including, for example, profilers of CPU time (typically sampling technology), profilers of program flow (typically event based technology), profilers of lower level system resource consumption (e.g. instruction traces, hardware performance counters). These tools do not allow the analyst to look more deeply into the behaviour of the application to understand the manner in which data is moved around and transformed by the application. Typically they report control flow, but knowledge of data flow (as with arguments and return values) is not visible. One reason for this lack of visibility is the complexity of recording this information in a generic fashion. For example, every method has a distinct signature.

Therefore analysts are often reduced to using special builds and specially instrumented code (e.g. with printfs, or System.out.println calls) to observe such detailed behaviour. While debuggers provide support for such low level visibility, they require built-in support in the virtual machine, and are typically quite heavyweight.

SUMMARY OF THE INVENTION

The present invention relates to instrumentation (e.g. for debugging or profiling) of Java programs. In particular, the byte code of a program is modified so that when it executes and method calls are made special instrumentation information is collected. Special diagnostic objects are hooked in that provide information about the arguments provided to the method and also, possibly, the values returned from it. Since the program then runs normally, apart from these additional objects and the invocations of methods on these objects, it can be used with JIT (just in time) compiled code and also in almost real-time.

The solution is to modify the class files to inject instrumentation that forces the reporting of arguments and return values for selected methods to a well defined interface. The class files may be application class files, middleware, library class files or any other form of class file.

The Java debugger environment provides access to similar (and richer) information, but it requires that the target VM be brought up with special options and that it supports the Java VM debug interface. No special support requirements, or release level requirements are placed on the VM with this solution. Any VM can be used with the technique described here.

This technique is not sensitive to JIT optimisations. It works in the presence of the JIT, and in the presence of aggressive JITing technology including inlining and code elimination. Many JDI/JVMDI (Java Debug Interface) implementations require the Java VM to be brought up in a mode that disables the JIT entirely. The approach here allows for the possibility of measuring a running system with less impact on performance—which in certain conditions can be the difference between running it at all or not. Further, with the opportunity for lower performance impact, the technique here could be coupled with explicit performance measurements (e.g. instruction counts per instrumented method invocation) with argument value tracking to help isolate more beneficial performance improvements.

According to a first aspect of the present invention there is provided a method for modifying a class file to monitor data flow, having the steps of: selecting one or more methods in the class file; adding one or more lines of code to report incoming arguments and return values, if any, in the selected method; reporting the incoming arguments and return values to an instrumentation interface; wherein the instrumentation interface categorises different types of incoming arguments or return values.

A class file may be a Java class file or a Microsoft Intermediate Language (MSIL) file.

The step of adding one or more lines of code may include interrogating incoming arguments and return values to determine their type.

The instrumentation interface is, preferably, an instrumentation class defining methods for each type of argument or return value in a method. The one or more lines of code may pass the incoming arguments and return values to the appropriate instrumentation class method. The class file may have appropriate references inserted into the constant pool for the class to refer to a set of methods in an instrumentation class.

The one or more lines of code to report incoming arguments may be inserted at the top of the method. The one or more lines of code to report return values may be inserted immediately prior to the return point(s) in the method body.

All other attributes of the class file may be adjusted to ensure consistency with the modification.

Method entry and exit events may also be passed to the instrumentation interface.

The class file to be modified may be first interrogated to obtain a count of arguments and the type of each argument.

The argument types may be one of primitive types: integer, byte, char, long, float, double and string, or may be objects or arrays.

The instrumentation class may get control with each method invocation, each incoming argument and each return value.

The instrumentation interface may send the instrumentation information to an analysis agent. The analysis agent may record types of arguments and return values with the frequency of each entry maintained as a count. The analysis agent may maintain a hash table for one of each unique method, incoming argument, return value and attributes of the method, argument or return value. Statistical information about arguments and return values may be reported by the analysis agent.

According to a fourth aspect of the present invention there is provided a profile of data flow having: a record of incoming arguments and return values, if any, for one or more methods in a class file; the record including data describing the types and values of arguments and return values and their distribution.

The record may include details of which first method called a second method. The profile may be provided in the form of a mapping of data. The profile may capture a complete call tree with details of calling arguments and return values summarised at each node in the call tree.

BRIEF DESCRIPTION OF THE DRAWINGS

Embodiments of the present invention will now be described, by way of examples only, with reference to the accompanying drawings in which.

DETAILED DESCRIPTION OF THE PREFERRED EMBODIMENTS

The described method and system may be implemented on a variety of hardware platforms, including personal computers, workstations, embedded systems, mini-computers, and mainframe computers.

Figure 1:
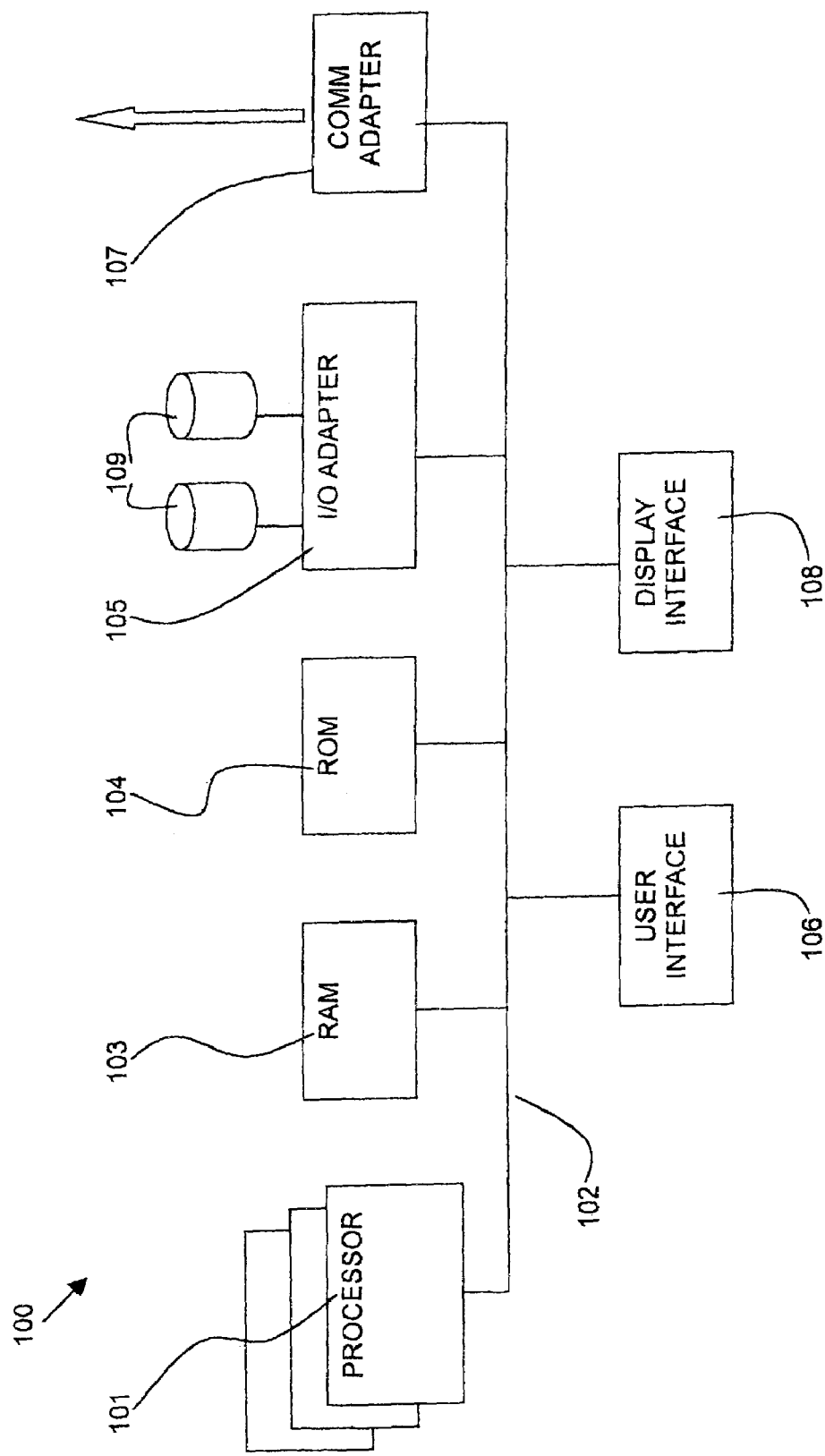
FIG. 1 is a block diagram of a system capable of executing a method in accordance with a preferred embodiment of the present invention.

Referring to FIG. 1, a typical configuration of a computer system is illustrated. The computer system 100 has at least one processor 101. Processor 101 is interconnected via a system bus 102 to random access memory (RAM) 103, read only memory (ROM) 104, an input/output (I/O) adapter 105 for connecting peripheral devices, a user interface adapter 106, a communications adapter 107, and a display adapter 108.

The communications adapter 107 may link the computer system 100 with any number of other computer systems or other devices, such as remote printers, remote servers, remote storage units, etc. The computer system 100 may be linked to both local area networks and wide area networks, such as the Internet.

The described method and system for modifying a class file to monitor data flow is given in the context of modifying a Java class file. The method and system may be implemented in any Java VM environment or on any type of class file where an intermediate code abstraction (e.g. byte code) is used. The method may also be used with Microsoft Intermediate Language (MSIL) files.

Java class files are often downloaded from a network, such as the Internet. The described method can be practised on any class file, regardless of how the class file is obtained. If a class file is obtained from a network, such as the Internet, it is typically loaded immediately into the Java VM and executed. Such Java class files are not usually saved on the user's hard disk or in a file system. Class files downloaded from a network are typically loaded directly into memory by the Java VM ClassLoader. Therefore, it is necessary to intercept the class file at the loader and transform its memory image directly.

A class file is loaded from a file system and the selected class file is opened and loaded into memory. It is known (for example from U.S. Pat. No. 6,026,237) to break the class file into its many parts, typically using a class file reader. Once the class file has been deconstructed, it can then be modified. The modifications may include any combination of adding, deleting, or modifying code and linkage information. For example, one or more code segments, each consisting of one or more lines of code, may be added at various points throughout the class file.

After modification, the class file is reconstructed and the class file, or methods within the class file, can be executed as desired by the user. Note that every method within the class file may be instrumented or only some of the methods may be instrumented. If only some of the methods are to be instrumented, it is possible to partially deconstruct the class file and instrument only the desired methods.

If a class file is downloaded from a network, a web browser may be modified so that it dynamically modifies class files coming from the network. As the web browser is also a class file, the same method can be used to modify the web browser as is used to modify downloaded Java class files.

Application code (e.g. Java class files) is interrogated and then uniquely instrumented to pass incoming argument values and method return values to an interface. The interface may be in the form of a new class which is set up and is referred to as the instrumentation class. The instrumentation class then interprets and records the argument values for later or real time analysis.

Application code is made up of a series of methods. The described method injects code at the top and bottom of each method which calls an instrumentation class. An instrumentation class is provided which is generic and may be used with different methods for receiving varying numbers of arguments and return values. This is achieved by providing a basic set of calls that allows a method to be implemented and the data to be captured. The basic set of calls of the instrumentation class are defined by the types of argument and return value. One call is defined for each type.

Arguments and return values of methods are reported to the instrumentation class. Method entry and exit events are also passed to the instrumentation class. The instrumentation class then interprets and records the argument values for later, or real time analysis. A user of the instrumentation may provide an implementation that implements the interface and uses the information gathered.

An example of an instrumentation class with sample methods is given below and is referred to as ArgHook instrumentation class.

```
class ArgHook {
/**
*class for recording arguments passed into a method.
*
*/
        public static void enterMethod ( String name )
{
        }
        public static void exitMethod ( String name ) {
        }
        public static void argObject ( int n, Object x)
{
                System.out.println(n + " : L " + x.toString( ));
        }
        public static void argByte ( int n, byte x ) {
                System.out.println(n + " : B " + x);
        }
        public static void argChar (int n, char x ) {
                System.out.println(n + " : C " + x);
        }
        public static void argDouble (int n, double x )
{
                System.out.println(n + " : D " + x);
        }
        public static void argFloat (int n, float x ) {
                System.out.println(n + " : F " + x);
        }
        public static void argInteger (int n, int x ) {
                System.out.println(n + " : I " + x);
        }
        public static void argLong (int n, long x ) {
                System.out.println(n + " : J " + x);
        }
        public static void argShort (int n, short x ) {
                System.out.println(n + " : S " + x);
        }
        public static void argBoolean (int n, boolean x
) {
                System.out.println(n + " : Z " + x);
        }
        public static void argVoid (int n, void x ) {
                System.out.println(n + " : V " + x);
        }
}
```

The described method for modifying a class file to monitor data flow starts with reading the class file for the class to be instrumented. For each method within the class file it is determined if the method is to be instrumented. This can be carried out by using a method inclusion list.

Appropriate references are inserted into the constant pool for the class to refer to a standard set of static methods in the instrumentation class, for example as defined above in the sample ArgHook instrumentation class.

For each method to be instrumented x, information is obtained about its arguments. This is done by interrogating the class file to obtain the count of arguments and the type of each argument. Method arguments can be one of the following primitive types: integer, byte, char, long, float, double, string (treated as an object) or can be an object or an array (treated as an object).

For each argument passed into the method, a byte code sequence is generated to pass the incoming argument to the appropriate instrumentation class method.

The byte code sequence is inserted into the top of the method and all other attributes of the class file are adjusted to ensure consistency.

The same sort of modification can be carried out for return values. However, the return value byte could be void. The location of the insertion of the byte code sequences for the return values will be immediately prior to the return point(s) in the method body.

Figure 2:
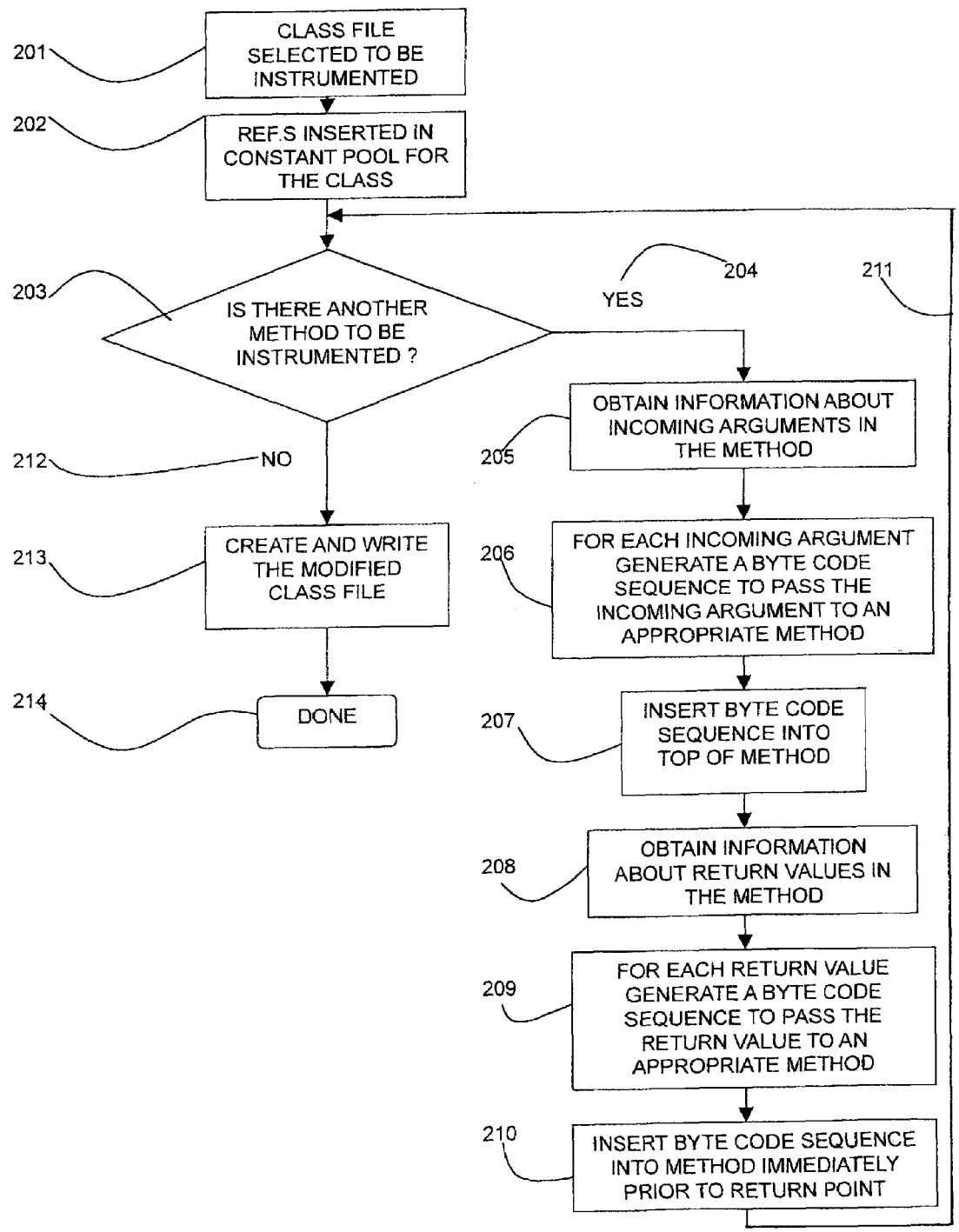
FIG. 2 is a flow diagram of the instrumentation of a class file in accordance with a preferred embodiment of the present invention.

Referring to FIG. 2, a flow diagram of the method of instrumenting a class file is shown. A class file is selected to be instrumented 201. Appropriate references are inserted 202 into the constant pool for the class to refer to the standard set of static methods in the instrumentation class.

It is then determined if there is a method to be instrumented 203. If there is a method to be instrumented 204, information is then obtained 205 regarding the incoming arguments in the method. For each incoming argument in the method a byte code sequence is generated 206 to pass the incoming argument to an appropriate method in the instrumentation class. The byte code sequence is inserted 207 into the top of the method and all the other attributes of the class file are adjusted to ensure consistency.

Information is then obtained 208 regarding the return value, if any, in the method. For a return value in the method a byte code sequence is generated 209 to pass the return value to an appropriate method in the instrumentation class. The byte code sequence is inserted 210 immediately prior to the return point in the method body.

A loop 211 then returns to the question of whether or not there is another method to be instrumented 203.

When there are no more methods to be instrumented 212 in the class file being instrumented, the modified class file is created and closed 213 resulting in the end of this method 214.

Figure 3:
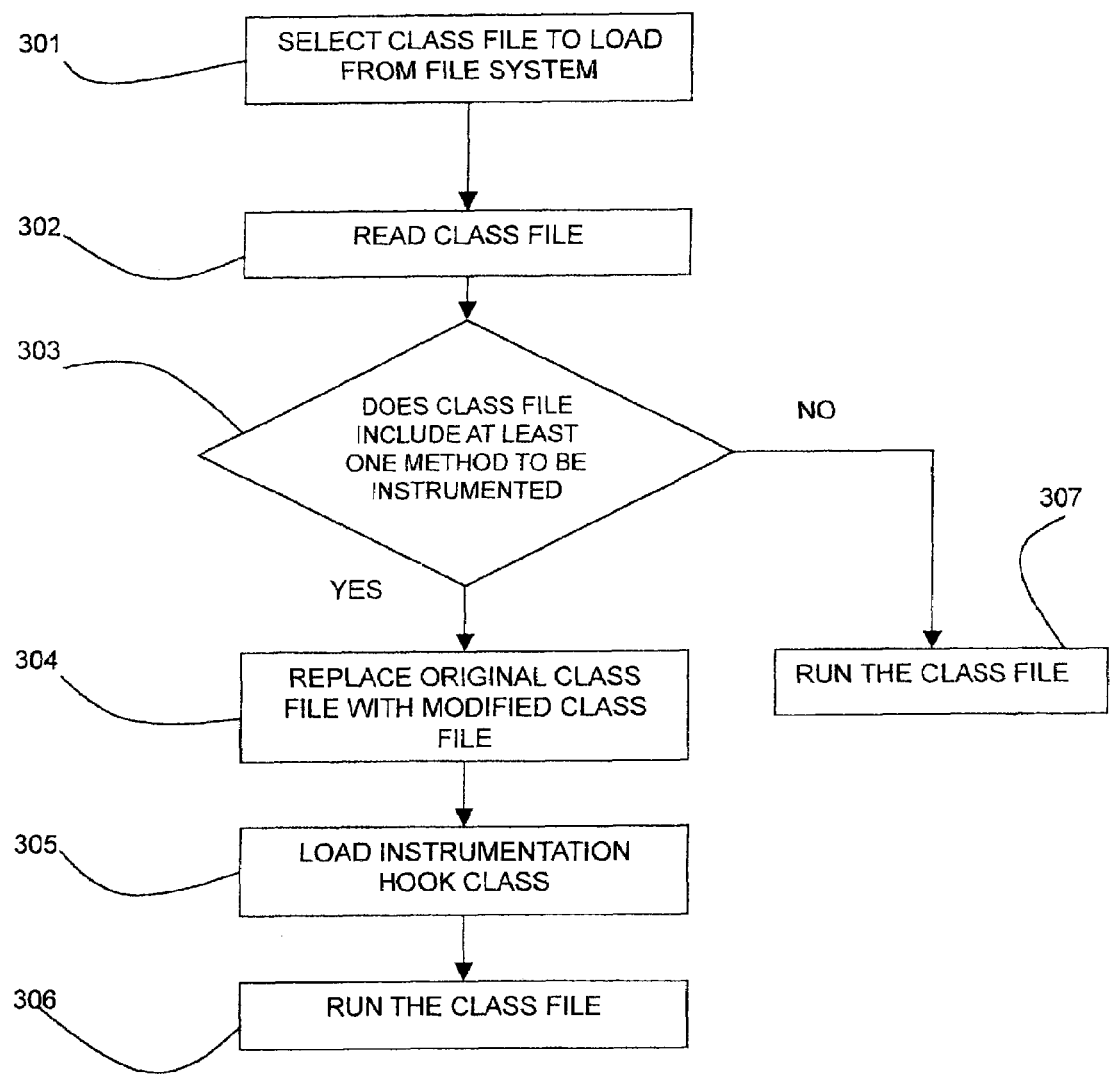
FIG. 3 is a flow diagram of the loading and running of a class file in accordance with a preferred embodiment of the present invention.

Referring to FIG. 3, a flow diagram shows the loading and running of a class file. A class file is selected 301 to load from the file system. The class file is then read 302. It is determined 303 if the class file includes at least one method to be instrumented.

If the class file includes at least one method to be instrumented, the original class file is replaced 304 with the modified class file as generated in the method shown in FIG. 2. The instrumentation class is then loaded 305 and the class file is run 306. The instrumentation class will get control with each method invocation, with each incoming argument and finally with the return value. Variants of the instrumentation class implementations can then deal with the argument/return value information as appropriate.

If the class file does not include a method to be instrumented, the class file is simply run 307.

Figure 4:
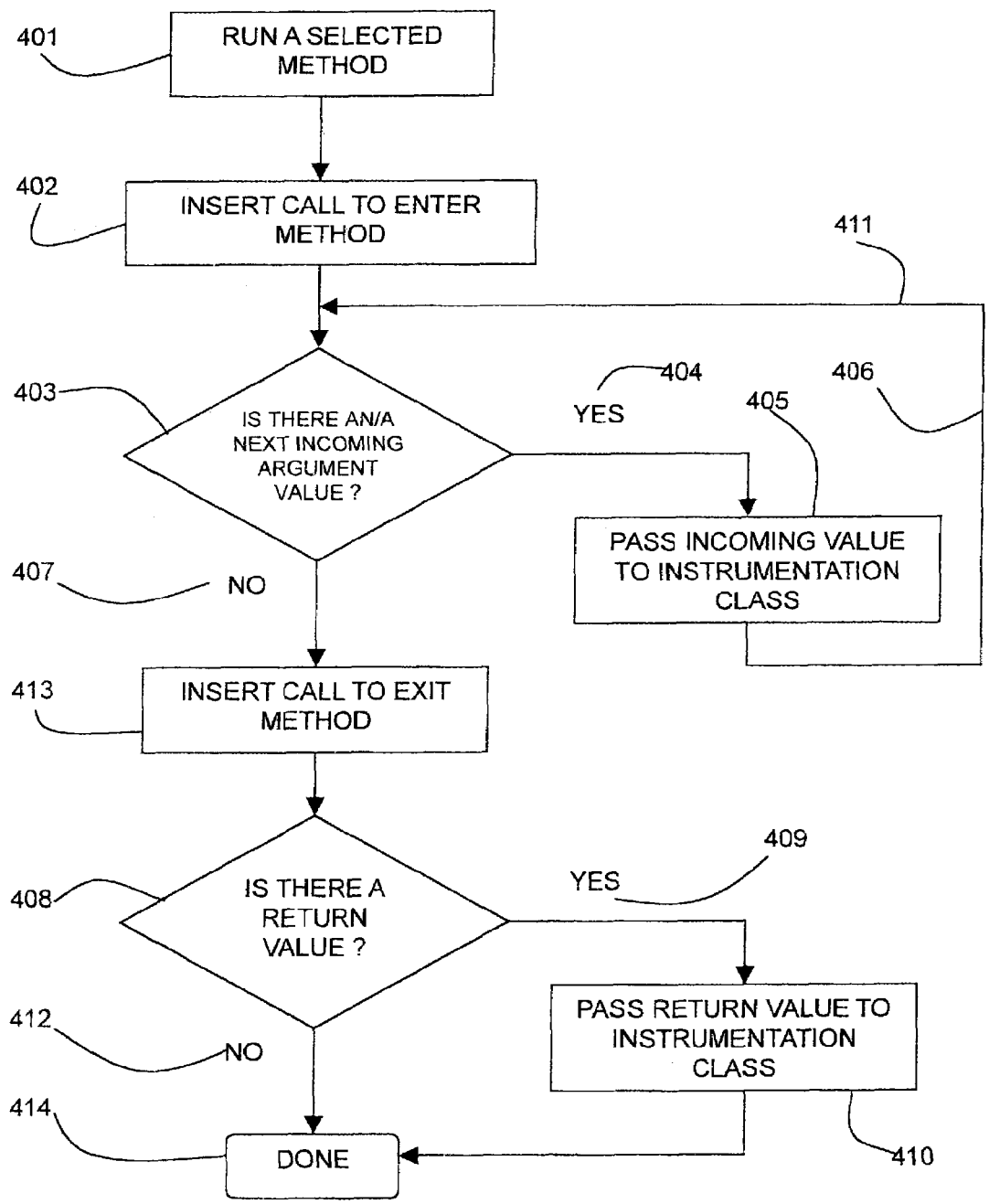
FIG. 4 is a flow diagram of the execution of a method in a class file in accordance with a preferred embodiment of the present invention.

FIG. 4 is a flow diagram of the steps of executing a method in a class file which has been modified for instrumentation. At the first step, a method is selected to be run 401. A call is inserted to the instrumentation enter method 402 to pass incoming arguments to the instrumentation class.

It is then determined 403 if there is an incoming argument value or a next incoming argument value. If there is an incoming value 404, the incoming value is passed 405 to the instrumentation class. A loop 406 then returns to determine 403 if there is another incoming value.

If it is determined 403 that there are no more incoming argument values 407, the method proceeds. Immediately prior to the return point(s) in the method, a call is inserted to the instrumentation exit method 413.

It is then determined 408 if there is a return value. If there is a return value 409, it is passed 410 to the instrumentation class and the method continues to its end 414.

Figure 5A:
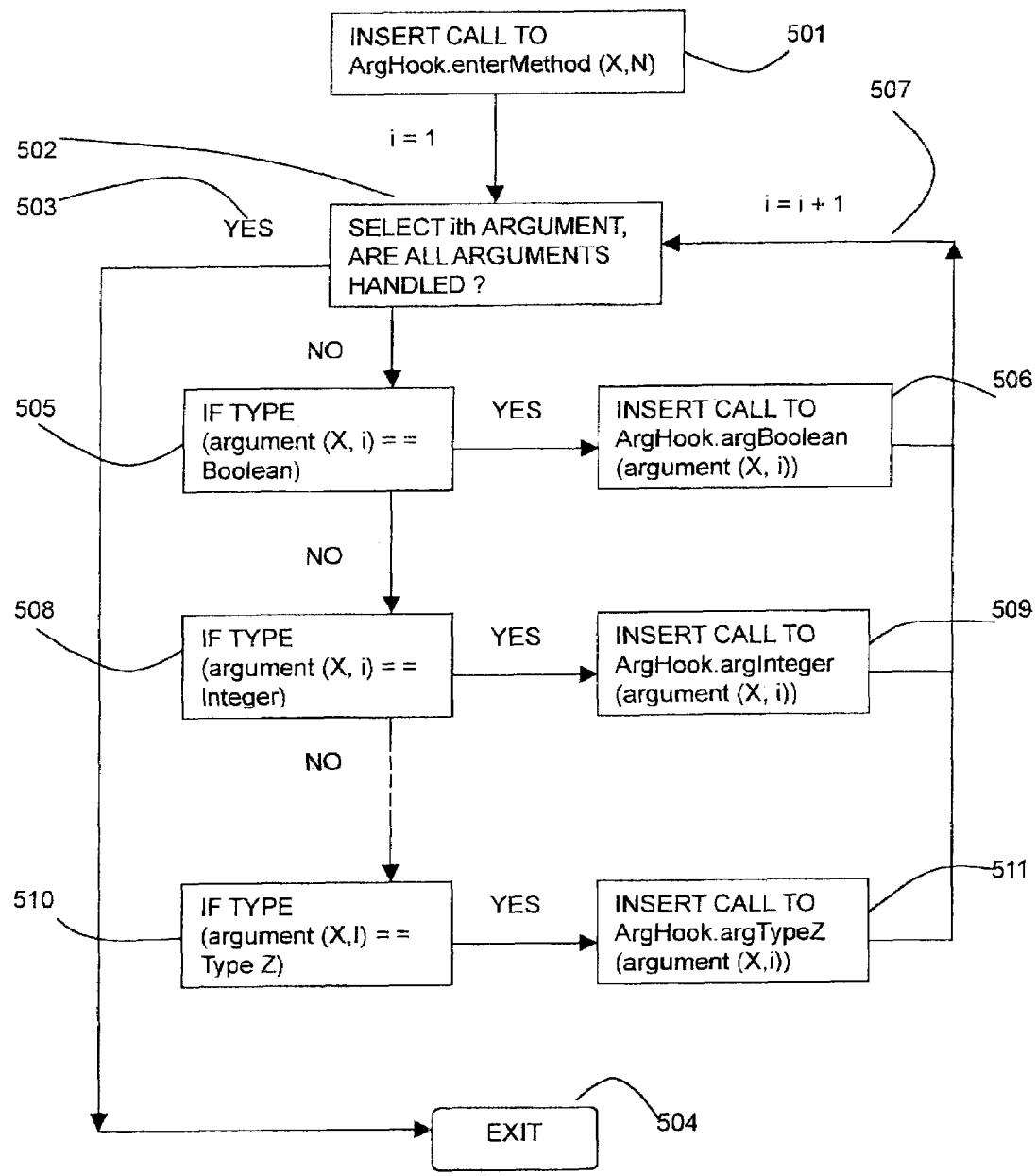
FIG. 5A is a flow diagram showing in further detail the instrumentation for incoming argument values in accordance with a preferred embodiment of the present invention.
Figure 5B:
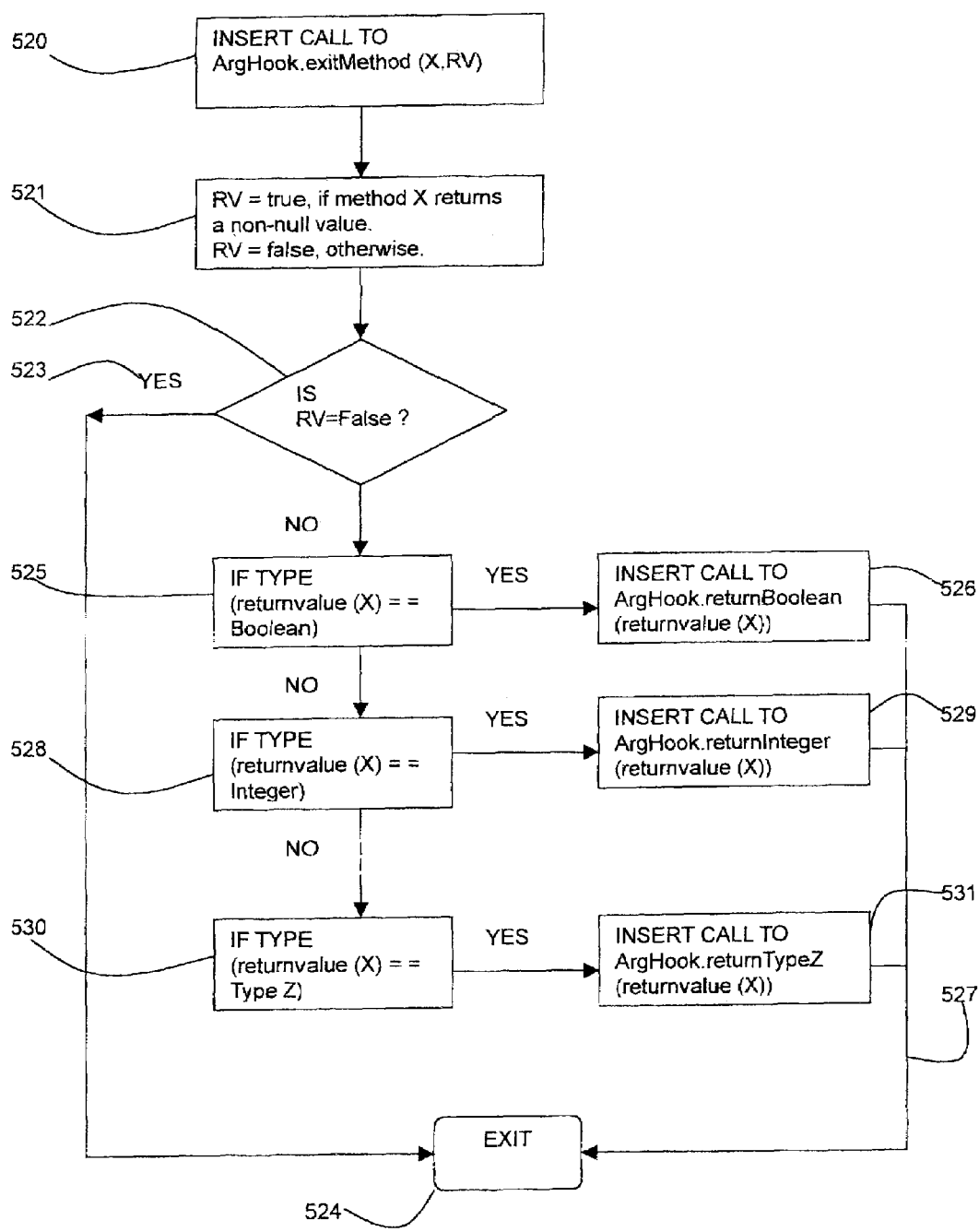
FIG. 5B is a flow diagram showing in further detail the instrumentation for a return value in accordance with a preferred embodiment of the present invention.

Referring now to FIGS. 5A and 5B, further details are given of the processes for instrumenting methods as shown generally in FIG. 2.

FIG. 5A shows the process of instrumenting incoming arguments to pass the incoming arguments to the instrumentation class as generally indicated in FIG. 2 at steps 206 and 207. The instrumentation class used is the example ArgHook class with the terms defined earlier.

A flow diagram shows a method X in a class that has N arguments. An insert call is made to ArgHook.enterMethod (X,N) 501. The ith argument is selected 502 starting with i=1. If all the arguments have been handled 503 the process exits 504.

For each argument i, it is determined if the argument is of a particular type as defined by the instrumentation class. The different possible types are tried one by one starting with the most specific type and becoming more general. For example, the type Object should be last as all arguments will be objects and this type is only used for arguments that have not been otherwise classified. Once an argument has been classified as a type, an insert call is made passing the argument to the instrumentation class. The next argument is then processed.

In FIG. 5A, it is determined at step 505 if the argument i is of a first type, which in this example is Boolean type. If it is, an insert call or invocation 506 is made to the instrumentation class of the form ArgHook.argBoolean(argument(X,i)) sending the argument value i for the method X to the Boolean category of the instrumentation class.

A loop 507 of the flow diagram then returns to selecting the next argument where i=i+1 unless all the arguments have been handled in which case the process exits 504.

If the step 505 determines that the argument is not of type Boolean, the flow diagram proceeds to the next possible type of argument. In the example, it is next determined 508 if the argument i is an Integer. If it is, an insert call 509 is made to the instrumentation class of the form ArgHook.argInteger (argument(X,i)) sending the argument value i for the method X to the Integer category of the instrumentation class. The loop 507 then returns to selecting the next argument where i=i+1 as before.

The flow diagram goes through each of the possible types of argument as defined in the instrumentation class. If the argument is not of any of the previous types, it reaches the final type and this is illustrated by the final type of TypeZ in the flow diagram. TypeZ may be a very general type that will capture all arguments that have not previously been categorised as one of the other defined types.

It is determined 510 if the argument i is of TypeZ. If it is, an insert call 511 is made to the instrumentation class of the form ArgHook.argTypeZ(argument(X,i)) sending the argument value i for the method X to the TypeZ category of the instrumentation class. The loop 507 then returns to selecting the next argument where i=i+1 as before until all arguments have been handled and the process exits 504.

FIG. 5B shows the process of instrumenting a return value to pass the return value to the instrumentation class as generally indicated in FIG. 2 at steps 209 and 210. The instrumentation class used is the example ArgHook class with the terms defined earlier. The process for a return value differs from that of FIG. 5A for the arguments as there can only be one return value at an exit call.

At step 520 an insert call is made to ArgHook.exitMethod (X,RV). The return value RV may not be anything or it may be one of the types defined in the instrumentation class. At step 521 it is defined that RV is true if the method X returns a non-null value and RV is false otherwise.

Step 522 determines if the RV is false (i.e. the RV is a null value). If the RV is false 523, the process exits 524.

If the RV is not false, then the flow diagram proceeds in a similar manner to that of FIG. 5A in that a series of types of return value are tested and if the return value is categorised as a type, an insert call is made to the instrumentation class passing the return value to that type in the class.

In FIG. 5B, it is determined at step 525 if the return value is of a first type, which in this example is Boolean type. If it is, an insert call or an invocation 526 is made to the instrumentation class of the form ArgHook.argBoolean(returnvalue(X)) sending the return value for the method X to the Boolean category of the instrumentation class. The flow diagram then proceeds 527 to exit 524.

If the return value is not of Boolean type, the process proceeds to the next type. In the example, it is next determined 528 if the return value is an Integer. If it is, an insert call 529 is made to the instrumentation class of the form ArgHook.argInteger(returnvalue(X)) sending the return value for the method X to the Integer category of the instrumentation class. The process then proceeds 527 to exit 524.

The flow diagram goes through each of the possible types of return value as defined in the instrumentation class. If the return value is not of any of the previous types, it reaches the final type and this is illustrated by the final type of TypeZ in the flow diagram. TypeZ may be a very general type that will capture all return values that have not previously been categorised as one of the other defined types.

It is determined 530 if the return value is of TypeZ. If it is, an insert call 531 is made to the instrumentation class of the form ArgHook.argTypeZ(returnvalue(X)) sending the return value for the method X to the TypeZ category of the instrumentation class. The process then proceeds 527 to exit 524.

Using the above process a class file such as an application, a class library, or piece of middleware can be instrumented to deliver information about incoming arguments and return values for all (or some subset of) methods in a class file. As the instrumentation class does not change for each method instrumented, it works in any environment and has the benefit of being portable.

The resulting information can be formed into a profile of the data flow which shows the categories or types of the data passed between methods. Previous profilers provide information regarding, for example, the frequency of a method call from method a to method b, the time of the call and the instructions executed. However, previous profilers do not provide information on the types of data being passed. The advantage of knowing the types of data being passed between methods is that coding of methods can be improved based on the distribution of incoming argument types.

For example, a method may have 90-100% of calls of the same length of 2 bytes or 80% of calls with the same value. As this information is made available by the described instrumentation process, it is possible to improve performance. For example, caching can be used for most frequently used return values, etc.

The profile produced by the described process allows a detailed map of who called who and what the argument distributions and return values are.

In the example given previously, the ArgHook instrumentation class prints out arguments and return values as they are passed to the instrumentation class. The arguments and return values could be accumulated to produce a map.

For example, a map of the following form may be produced:
Method A calls Method B
With frequency NNNNN With arguments and return values having the following distribution

| (1, "abc") | 100 times | returning 10 | 10 times |
| (2, "abc") | 10 times  | returning 7  | 5 times  |
|            |           | returning 77 | 5 times  |

The above is a simple example. The resulting profile could capture complete call trees with details of calling arguments and return values summarised at each node in the call tree.

This information can then be sent to an analysis agent that focuses on identifying opportunities for introducing caching to improve performance.

The agent records information about:
1. Method entries (along with name of method, signature, class information, instance identification if this is an instance method). The frequency of entries is maintained as a count.
2. For each such unique method, and for each incoming argument position, the agent maintains a hash table. The hash table records the object (or some attribute of the object) passed into the method.
3. If the same object (or value) has been submitted as an argument before, then a count is incremented to indicate this. The hash table is used to keep track of the uniqueness of incoming arguments.
4. For each unique return value that the method returns, the same kind of information is kept in a separate hash table.

At completion of execution, or on some other indication, the statistical information about argument values and return values is reported.

The analyst can then observe the distribution of argument values for methods that are frequently executed. This information can then be used to determine if a caching implementation would benefit a particular method. It can also be used to determine the general range of arguments presented to a method, and this can help with restructuring of a method to deal better with the most common cases.

A weak hash map would be required in order not to perturb the behaviour of the system too much; otherwise, the caching of the argument would result in keeping the object around longer than it might ordinarily be.

Also, special handling of base type arguments (e.g. int, byte) would be needed. This can be done by the creation of special integer hash tables, byte hash tables, etc.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A computer-implemented method for modifying a class file to monitor data flow, comprising the steps of:
    interrogating the class file, before performing any modifications, in order to obtain a count of arguments and a type of each argument used by the class file;
    instrumenting performance monitoring instructions or references into the class file to monitor the performance of the class file, by performing at least the following:

inserting into a constant pool for a class, one or more references to a set of methods in an instrumentation class;

adding one or more lines of code to report incoming arguments and their type of a method invocation to a selected method, if any, wherein the one or more lines of code to report incoming arguments is inserted at a top of the selected method and argument types include array types;

adding one or more lines of code to report return arguments and their type of a method invocation to a selected method, if any, wherein the one or more lines of code to report return arguments is inserted prior to the return point in the method body; and adding one or more lines of code to report entry and exit events to the class;

providing an instrumentation class, wherein the instrumentation class defines a plurality of monitoring methods, each monitoring method corresponding to a respective instrumented performance monitoring reference or performance monitoring instruction line of code, for receiving monitoring data;

creating an instrumentation interface by instantiating the instrumentation class and wherein the instrumentation interface has a plurality of operations that correspond to the monitoring methods;

reporting the monitored data to the instrumentation interface wherein the interface gets control with each indication of an instrumented method invocation, incoming argument and return value; and categorizing, by the instrumentation interface, different types of incoming arguments and return values for the selected method and other performance data, wherein the instrumentation interface sends the performance data to an analysis agent that records at least a count of the argument types and return values and the analysis agent maintains a hash table for one of each unique method, incoming argument, return value and attribute of the selected method based on the performance data such that statistical information is reported.

* * * * *